No. 667,231. Patented Feb. 5, 1901.
H. G. LAYNG.
APPARATUS FOR WASHING WOOL.
(Application filed May 15, 1900.)
(No Model.)
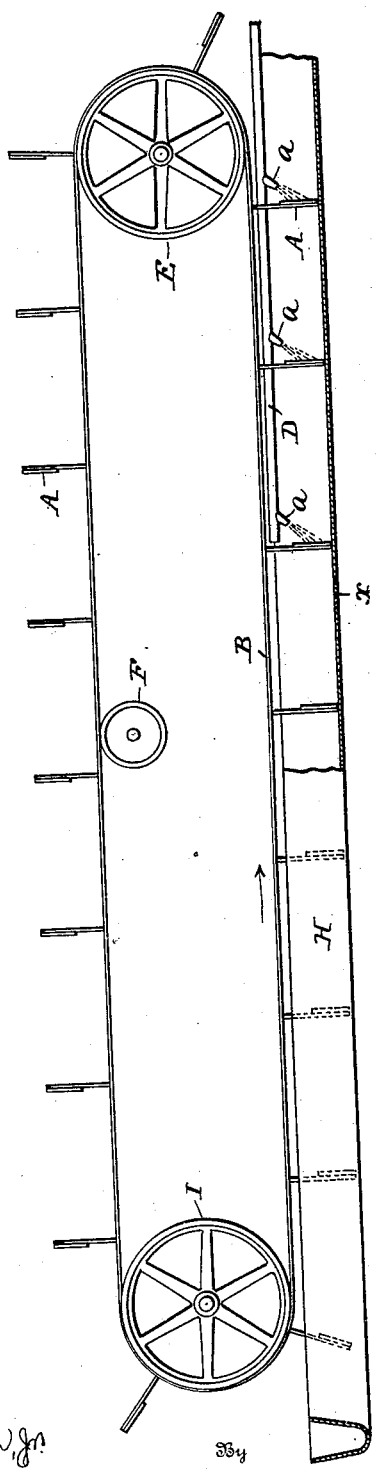

UNITED STATES PATENT OFFICE.

HENRY GRANT LAYNG, OF SOUTH AMBOY, NEW JERSEY.

APPARATUS FOR WASHING WOOL.

SPECIFICATION forming part of Letters Patent No. 667,231, dated February 5, 1901.

Application filed May 15, 1900. Serial No. 16,773. (No model.)

*To all whom it may concern:*

Be it known that I, HENRY GRANT LAYNG, a citizen of the United States, residing at South Amboy, in the county of Middlesex and State of New Jersey, have invented certain new and useful Improvements in Apparatus for Washing Wool, &c., of which the following is a specification.

My invention relates to that class of apparatus intended for washing wool, cotton, pith, and other materials; and my invention consists of an apparatus in which there is a narrow trough for receiving the material, a conveyer for carrying it along the trough, and means for injecting streams of wash liquor against the advancing material, so as to subject the material to the action of fresh wash liquor and reduce the amount of liquor required, as fully set forth hereinafter and as illustrated in the accompanying drawing, in which the figure is a longitudinal view, in part section, illustrating one form in which my improved apparatus may be embodied.

The material to be operated upon is conveyed along a trough H, of any suitable form and arranged either horizontally or inclined, and is maintained in motion through the medium of any suitable conveyer. As shown the conveyer is an endless belt B, provided with a series of arms carrying flights or wings G, conforming in outline to the transverse sectional form of the trough, the said belt passing around wheels I E and supported intermediate these wheels, if necessary, by one or more idler-wheels F. The wheels I E or either of the same may be driven from any suitable source of power, so as to impart a continuous traveling motion to the conveyer in the direction of its arrow.

In order that the material which is carried by the conveyer along the trough H may be washed without making use of large volumes of water and without bringing the water charged with impurities into repeated contact with the main body of the material, I inject streams of water upon the material as it passes along the trough, which latter is preferably inclined so as to facilitate the discharge of the water by gravity either from the lower end of the trough or through openings $x$ at the bottom of the trough. The water is conducted to the trough through a pipe D, provided with openings or nozzles $a$, one or more, arranged to direct streams of water toward the advancing material. It will be seen that the water from the first stream passes away from the body of the material before the latter advances to the second stream, so that the material is subjected to successive streams of fresh cleansing liquid and is not, therefore, brought into contact with liquid saturated with impurities, as is the case when the material is immersed in a tank, as usual, and it will further be seen that by the means described the cleansing is effected without the necessity of employing so large a volume of water as is required by the use of ordinary apparatus.

Without limiting myself to the precise construction and arrangement of parts shown, I claim as my invention—

1. A washing apparatus consisting of a trough adapted to receive material to be washed, a conveyer for feeding the material along the said trough, and a pipe for conveying the wash liquor provided with nozzles arranged to inject streams of the liquor against the advancing material in the trough, substantially as set forth.

2. The combination in a washing apparatus, of a trough, a belt conveyer provided with arms supporting flights adapted to the trough, wheels supporting the conveyer above the trough, and a pipe for conveying wash liquor provided with nozzles arranged to project streams of said liquor against the advancing material, substantially as set forth.

In testimony whereof I have signed my name to this specification in the presence of two subscribing witnesses.

HENRY GRANT LAYNG.

Witnesses:
 L. MORRISON,
 THEODORE M. HILL.